(12) United States Patent
Bartek et al.

(10) Patent No.: US 8,316,309 B2
(45) Date of Patent: Nov. 20, 2012

(54) USER-CREATED METADATA FOR MANAGING INTERFACE RESOURCES ON A USER INTERFACE

(75) Inventors: Velda Bartek, Apex, NC (US); Joseph A. Bohn, Durham, NC (US); Kathryn H. Britton, Chapel Hill, NC (US); Samar Choudhary, Morrisville, NC (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 11/756,449

(22) Filed: May 31, 2007

(65) Prior Publication Data

US 2008/0301552 A1 Dec. 4, 2008

(51) Int. Cl.
*G06F 3/00* (2006.01)
(52) U.S. Cl. ........ 715/747; 715/744; 715/745; 715/762; 715/763; 715/765; 717/136
(58) Field of Classification Search .................. 715/700, 715/744, 745, 747, 762, 763, 765; 717/136
See application file for complete search history.

(56) References Cited

U.S. PATENT DOCUMENTS

| | | | |
|---|---|---|---|
| 5,999,904 A | | 12/1999 | Brown et al. |
| 6,028,605 A | * | 2/2000 | Conrad et al. ................ 715/840 |
| 6,351,776 B1 | * | 2/2002 | O'Brien et al. ............... 709/245 |
| 6,493,731 B1 | * | 12/2002 | Jones et al. .................... 715/234 |
| 6,519,603 B1 | | 2/2003 | Bays et al. |
| 6,859,909 B1 | | 2/2005 | Lerner et al. |
| 7,032,182 B2 | * | 4/2006 | Prabhu et al. ................. 715/805 |
| 7,171,472 B2 | * | 1/2007 | O'Brien et al. ............... 709/226 |
| 7,266,563 B2 | * | 9/2007 | Morris et al. ................. 707/102 |
| 7,337,207 B2 | * | 2/2008 | O'Brien et al. ............... 709/200 |
| 7,496,578 B2 | * | 2/2009 | O'Brien et al. ................. 707/10 |
| 2001/0051958 A1 | | 12/2001 | deVries et al. |
| 2002/0059278 A1 | * | 5/2002 | Bailey et al. ................. 707/100 |
| 2002/0133561 A1 | * | 9/2002 | O'Brien et al. ............... 709/213 |
| 2003/0126212 A1 | * | 7/2003 | Morris et al. ................. 709/205 |
| 2004/0010491 A1 | * | 1/2004 | Riedinger ........................ 707/3 |
| 2004/0189694 A1 | * | 9/2004 | Kurtz et al. .................... 345/738 |
| 2004/0242322 A1 | * | 12/2004 | Montagna et al. .............. 463/29 |
| 2005/0057560 A1 | * | 3/2005 | Bibr et al. ..................... 345/418 |
| 2005/0080782 A1 | | 4/2005 | Rapnaparkhi et al. |
| 2005/0138034 A1 | * | 6/2005 | Faraj ............................... 707/10 |
| 2005/0138193 A1 | * | 6/2005 | Encarnacion et al. ........ 709/230 |

(Continued)

OTHER PUBLICATIONS

IBM Maximo Application Developer Guide, Pub. Date: Oct. 23, 2005, IBM, URL: http://publib.boulder.ibm.com/infocenter/tivihelp/v3r1/topic/com.ibm.mam.doc_7.1/pdf/mam71_app_dev_guide.pdf.*

(Continued)

*Primary Examiner* — Ba Huynh
(74) *Attorney, Agent, or Firm* — Law Office of Jim Boice

(57) ABSTRACT

A computer-implementable method enables a user to customize navigation of User Interface (UI) resources that are displayed on a computer User Interface (UI). A computer receives, from a user, an input of user-created metadata. This user-created metadata is associated with one or more UI resources that are depicted on a UI. In response to a user inputting specific metadata, the computer retrieves one or more UI resources that are associated with the specific metadata that has been input by the user. These retrieved one or more UI resources are displayed on the UI.

19 Claims, 14 Drawing Sheets

U.S. PATENT DOCUMENTS

| | | |
|---|---|---|
| 2005/0171956 A1* | 8/2005 | O'Brien et al. .................. 707/10 |
| 2005/0188174 A1 | 8/2005 | Guzak et al. |
| 2005/0192979 A1 | 9/2005 | Keller et al. |
| 2005/0193132 A1* | 9/2005 | O'Brien et al. ............... 709/229 |
| 2005/0193380 A1* | 9/2005 | Vitanov et al. ................ 717/143 |
| 2005/0216457 A1 | 9/2005 | Walther et al. |
| 2005/0235343 A1* | 10/2005 | Stephens ............................ 726/6 |
| 2006/0041564 A1* | 2/2006 | Jain et al. ....................... 707/100 |
| 2006/0203257 A1* | 9/2006 | McLuckie et al. ............. 358/1.1 |
| 2006/0235871 A1* | 10/2006 | Trainor et al. ................ 707/102 |
| 2007/0005576 A1* | 1/2007 | Cutrell et al. ..................... 707/3 |
| 2007/0073688 A1* | 3/2007 | Fry ................................... 707/6 |
| 2007/0073751 A1* | 3/2007 | Morris et al. ................. 707/101 |
| 2007/0073840 A1* | 3/2007 | O'Brien et al. ............... 709/217 |
| 2007/0130205 A1* | 6/2007 | Dengler et al. ............ 707/104.1 |
| 2007/0180432 A1* | 8/2007 | Gassner et al. ............... 717/136 |
| 2007/0192357 A1* | 8/2007 | Grizzard ........................ 707/102 |
| 2008/0104542 A1* | 5/2008 | Cohen et al. .................. 715/810 |
| 2008/0127063 A1* | 5/2008 | Silva et al. .................... 717/107 |
| 2008/0127220 A1* | 5/2008 | Morris ........................... 719/320 |
| 2008/0263142 A1* | 10/2008 | Glass et al. ................... 709/203 |
| 2008/0270451 A1* | 10/2008 | Thomsen et al. ............. 707/102 |

OTHER PUBLICATIONS

"IBM Maximo App. Developer Guide", Pub. Date: Sep. 30, 2005. Online Publication.

R. Chaiken et al., "Hypermedia Documents Using a Server in a Collaborative Session", IBM Technical Disclosure Bulletin, vol. 38, No. 7, Jul. 1995, pp. 335.

Anonymous, "Searching for Annocation in Documents on a Computer", RD 318024, Research Disclosure, Oct. 10, 1990, 1 page.

* cited by examiner

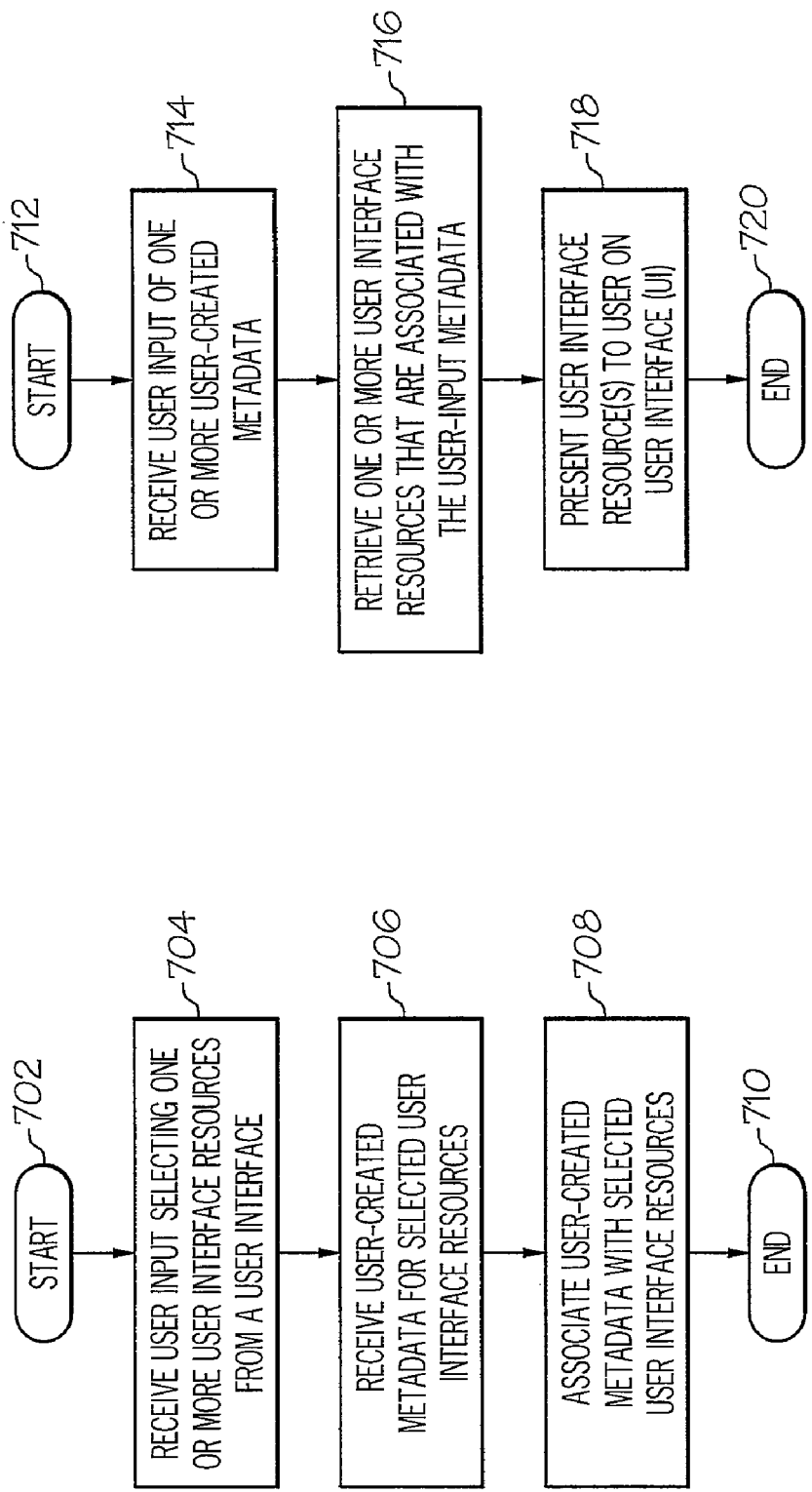

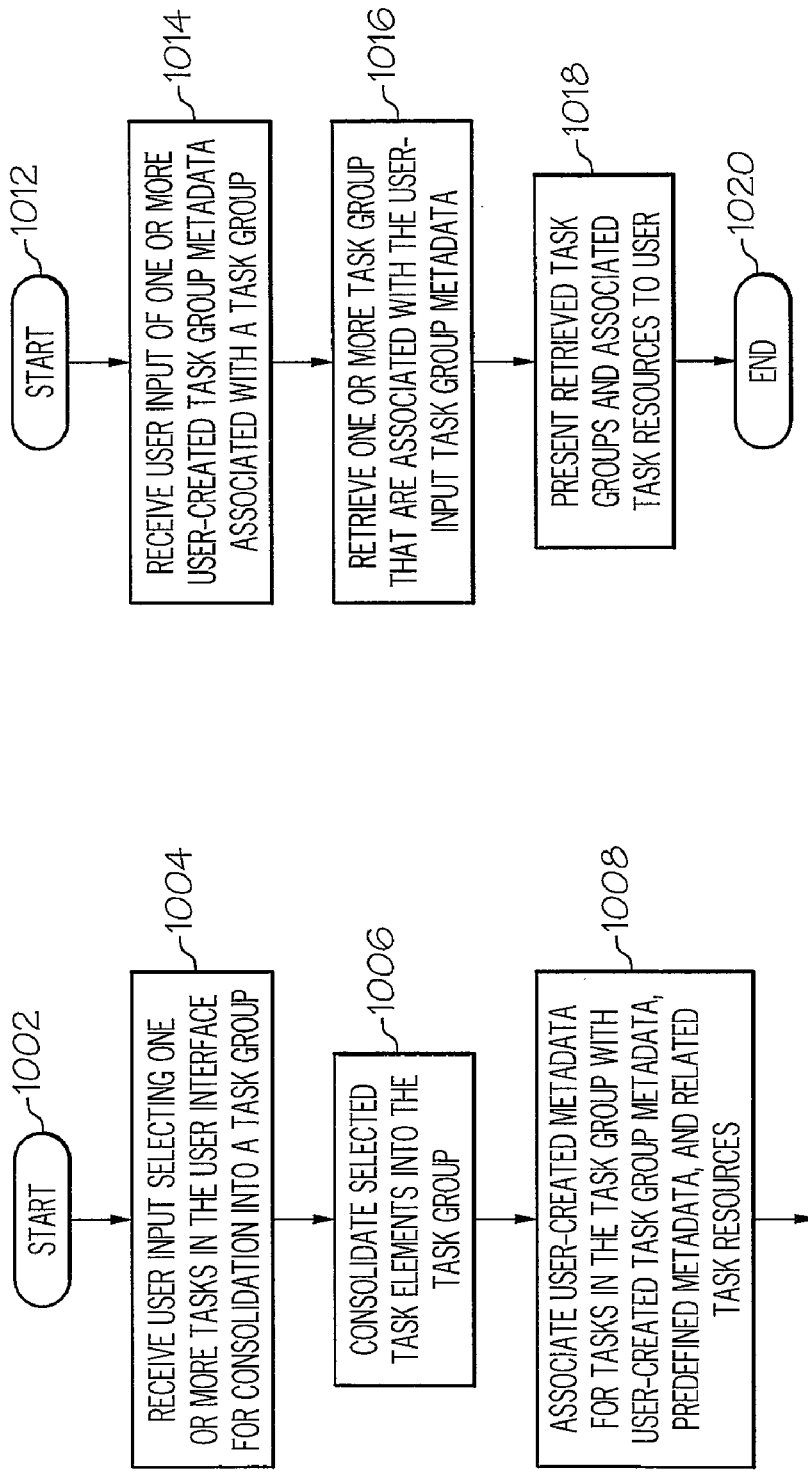

USER-CREATED METADATA FOR MANAGING INTERFACE RESOURCES ON A USER INTERFACE

BACKGROUND OF THE INVENTION

The present disclosure relates in general to the field of computers and other data processing systems, including hardware, software and processes. More particularly, the present disclosure pertains to tailoring the way interface resources are managed on a User Interface (UI).

SUMMARY OF THE INVENTION

A computer-implementable method enables a user to customize the management and navigation of interface resources that are displayed on a computer User Interface (UI). A computer receives, from a user, an input of user-created metadata. This user-created metadata is associated with one or more User Interface (UI) resources that are depicted on a UI. In response to a user subsequently inputting specific metadata, the computer retrieves one or more UI resources that are associated with the specific metadata that has been input by the user. These retrieved one or more UI resources are then displayed on the UI. These user-created metadata provide for user-specified selection criteria, which may be persisted, for particular UI resources that are needed by the user.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 7A-B are high-level flow-charts showing steps taken to create and utilize user-created metadata that are associated with specific UI resources;

FIGS. 10A-B are high-level flow-charts showing steps taken to create and utilize user-created task group metadata.

DETAILED DESCRIPTION OF THE PREFERRED EMBODIMENT

Many User Interfaces (UIs), such as Web-based administration consoles, contain a variety of user interface resources. A User Interface (UI) resource is defined as a resource that is available to a user through a UI, and includes, but is not limited to, user-fillable forms and other types of data-input widgets, wizards (for guiding a user through a process such as software maintenance, hardware maintenance, etc.), property notebooks (e.g., tabbed widgets), portlets (e.g., a UI component that provides access to a portlet application, such as a type of website, e-mail, etc., and can be used across multiple different websites), portal pages (i.e., webpages that have been specially designed to provide access to a pre-defined set of webpages), and Web pages. Generally, the user interfaces include some form of navigation mechanism, such as a navigation tree, so that the user can find the UI resources needed to achieve certain goals.

As the quantity of UI resources, locating a UI resource becomes increasingly difficult, thus making it increasingly difficult for a user to perform specific tasks or to achieve specific goals. This is particularly difficult with regards to UI resources that a user utilizes infrequently. The problem becomes exacerbated if search tools, names of files/resources/tasks, and search metadata are not intuitive to a user. For example, a navigation tree may display files that are named and assigned metadata according to criteria established by the programmer that may not be sensible or memorable to a user.

Thus, presently presented are a method, system and computer-readable medium that are used to allow a user to define user-created metadata to be associated with particular UI resources, or alternatively to particular UI-based tasks, such that these UI resources and/or tasks are easily managed in a customized manner.

Figure 1:
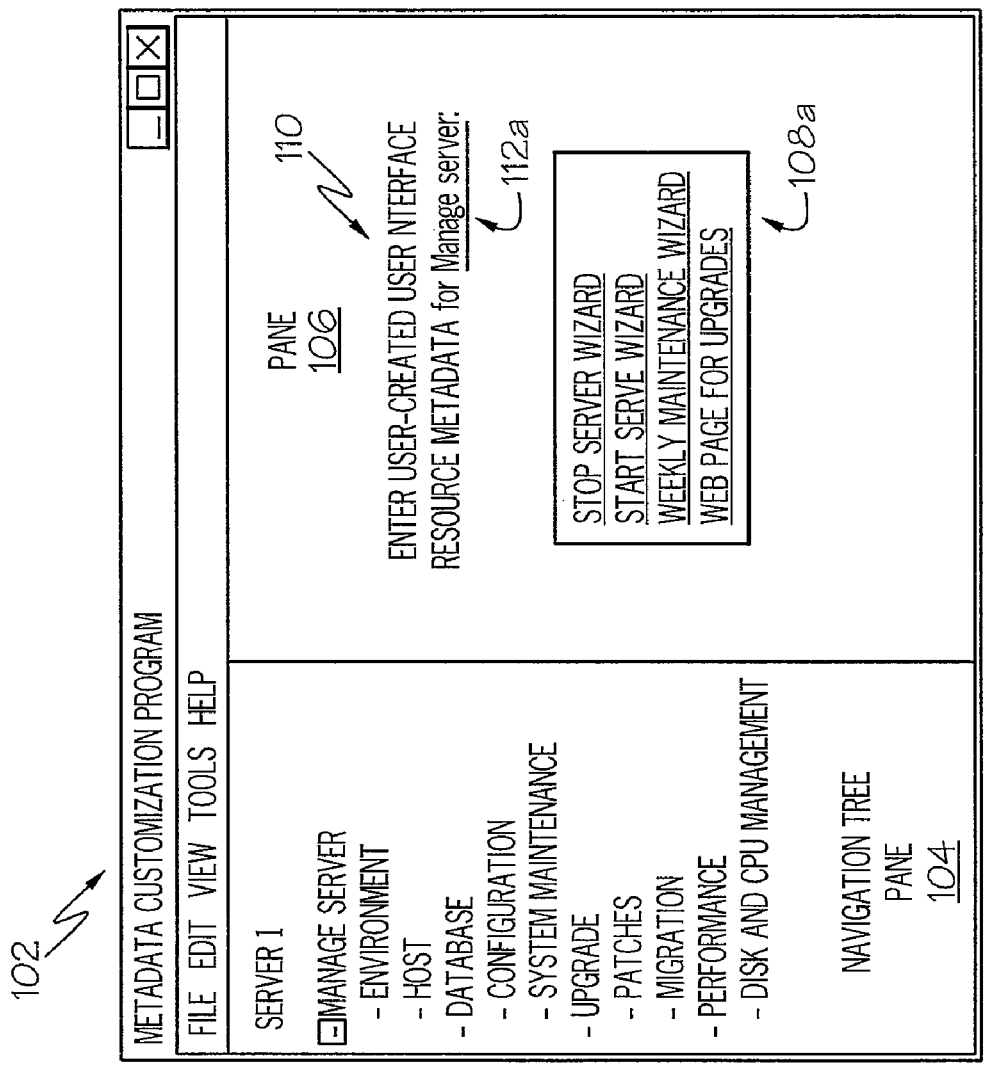
FIGS. 1-3 depict a User Interface (UI) for a metadata customization program, which provides a data input widget for associating user-created task metadata with user-selected tasks.

With reference now to the figures, and in particular to FIG. 1, a User Interface (UI) 102 for a metadata customization program is depicted. UI 102 includes a navigation tree pane 104, which shows, in expandable and collapsible form, various User Interface (UI) resources that are available for a server ("Server 1").

UI 102 also includes a pane 106, which displays a metadata input widget 108*a*. As suggested by the instructions 110 depicted in pane 106, a user can enter user-created metadata (e.g., "Stop server wizard", "Start server wizard", "Weekly maintenance wizard", "Web page for upgrades") to be associated with the UI resource "Manage server" for "Server 1". These entered user-created metadata describe, in a manner that is logical and memorable to the user who created the user-created metadata, different UI resources that are part of the main UI resource "Manage server." That is, the user-created metadata describe some or all of the UI resources that are available to an end-user if an end-user were to click the field "Manage server" in navigation tree pane 104. As will be described later, clicking such a field from a navigation tree pane in a customized view display UI (e.g., UI 602 shown below in FIGS. 6A-B) pulls up some or all UI resources that make up the main UI resource that has been retrieved and clicked.

Note that field 112*a* was auto-populated with the term "Manage Server" when a user clicked "Manage server" in the navigation tree pane 104, thus providing the user with an addition indicator for which UI resource is being customized with new user-created metadata.

As depicted and described in FIG. 1, the user has now input her unique metadata for a particular UI resource. Since this user-created metadata makes logical sense to that user, the task of future retrieval, management and execution of certain types of UI resources and/or tasks to complete a project will be easy.

Figure 2:
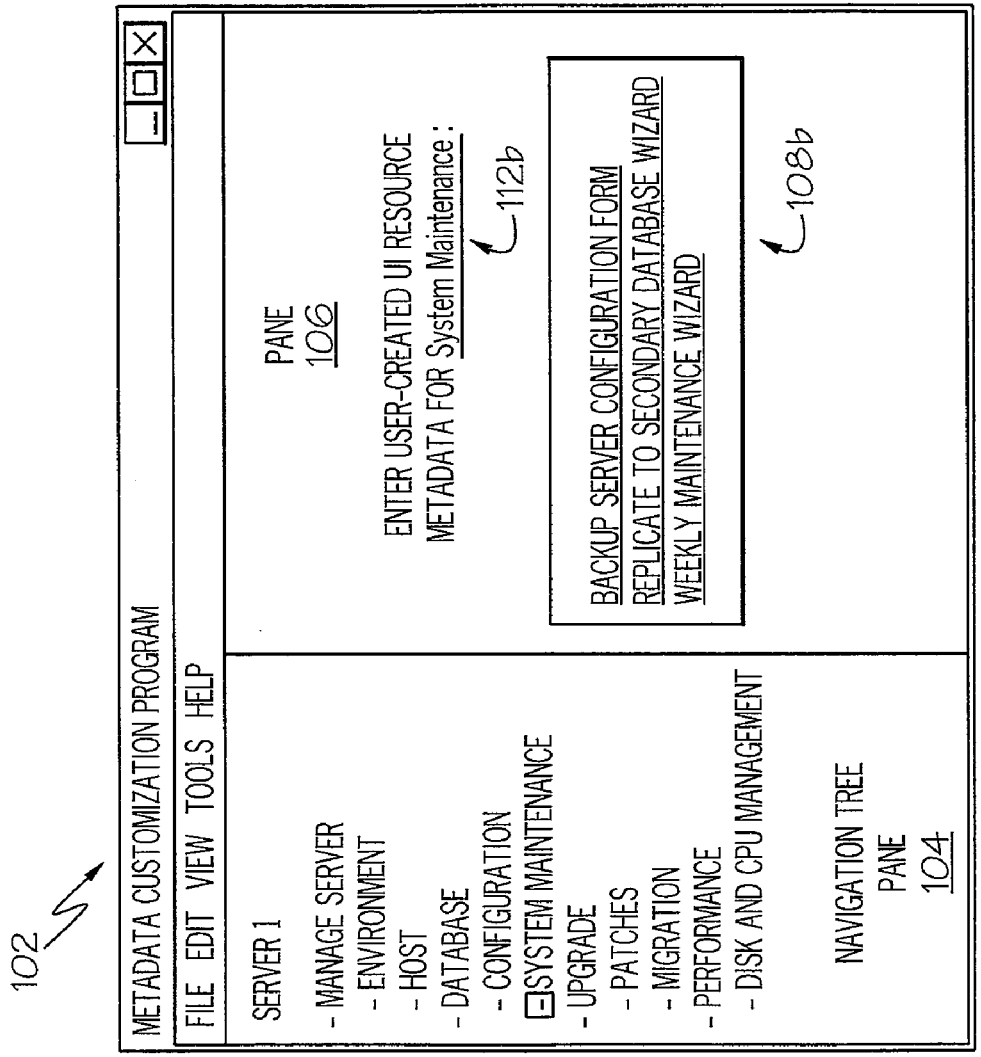

As illustrated in FIG. 2, the user can similarly input user-created UI resource metadata for "System Maintenance" of Server 1. In the example shown, the user has created the UI resource metadata "Backup server configuration form", "Replicate to secondary database wizard", and "Weekly maintenance wizard", and has input these user-created metadata into metadata input widget 108b. Note also that active field 112b was auto-populated with the term "System Maintenance" when the user clicked "System Maintenance" in navigation tree pane 104.

Figure 3:
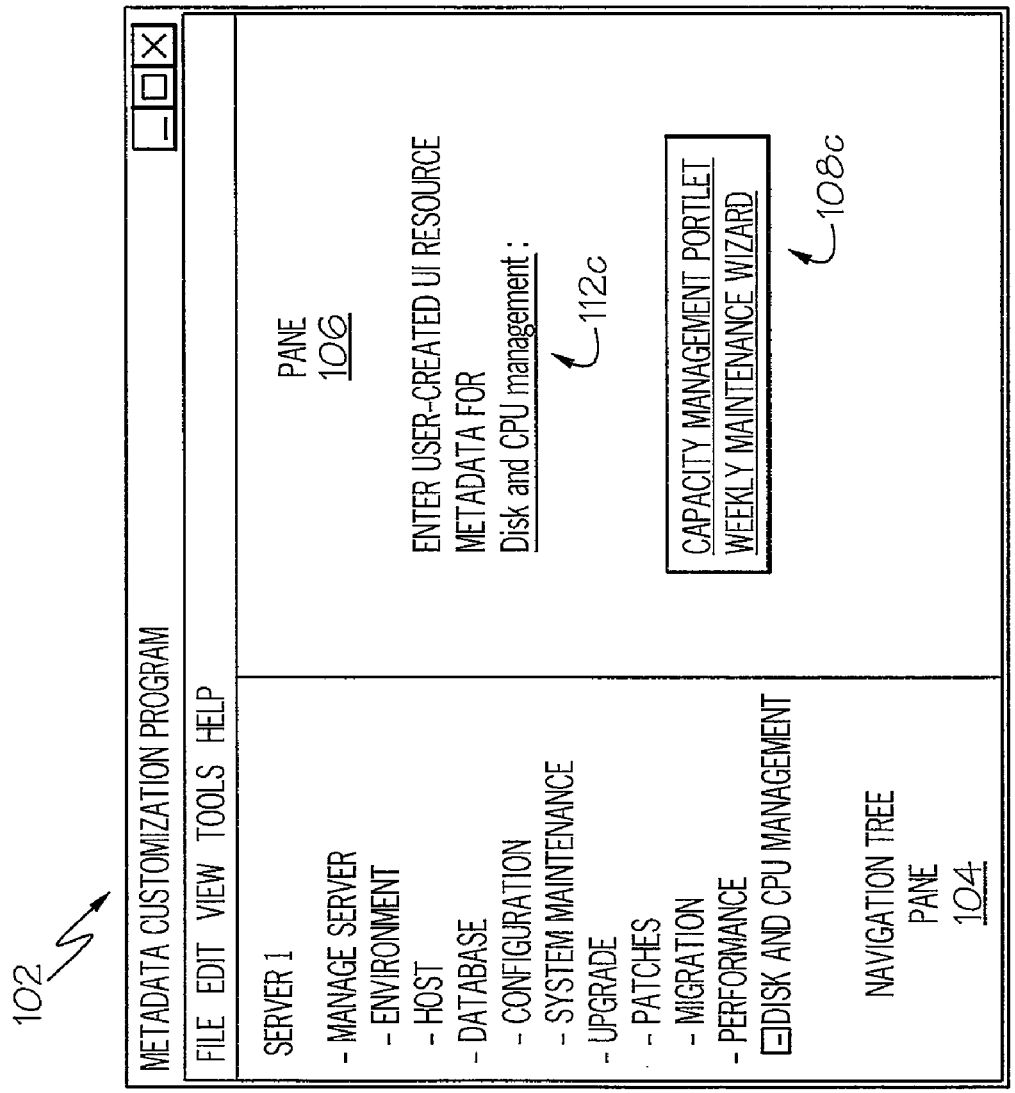

Similarly, as illustrated in FIG. 3, the user can input user-created metadata for the UI resource "Disk and CPU management" for Server 1. In the example shown, the user has created and input the user-created metadata "Capacity management portlet" and "Weekly maintenance wizard" into metadata input widget 108c. As in the examples shown above in FIGS. 1-2, this user-created metadata describes two UI resources that can be found in the UI resource "Disk and CPU management." Note also that active field 112c was auto-populated with the term "Disk and CPU management" when the user clicked "Disk and CPU management" in navigation tree pane 104.

Figure 4A:
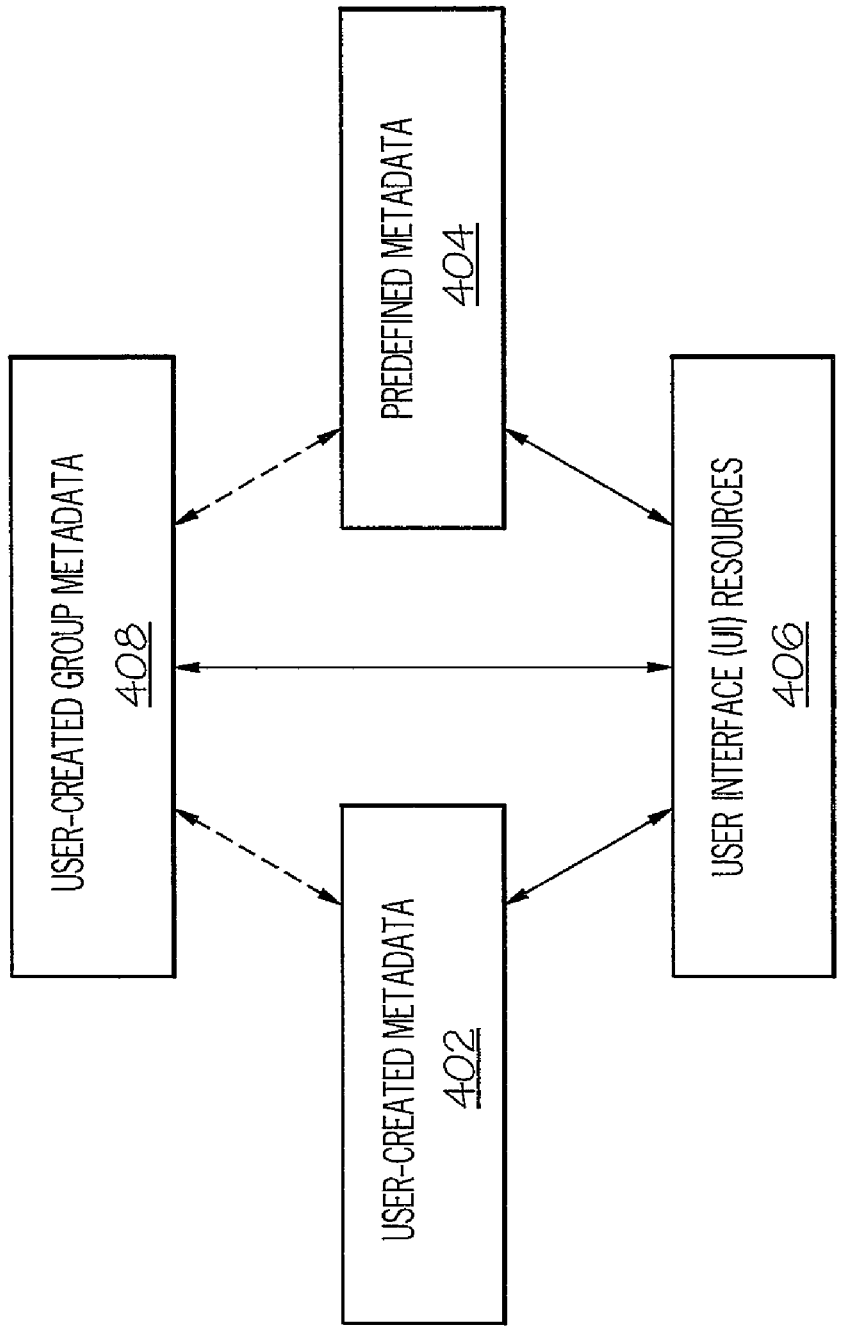
FIG. 4A illustrates relationships among user-created group metadata, user-created metadata, non-user-defined metadata and User Interface (UI) resources.

Referring now to FIG. 4A, a logical relationship among different metadata and UI resources is shown. The user-created metadata 402, such as the metadata that was input into input widgets 108a-c in FIGS. 1-3, is associated with (e.g., mapped to, aligned with, logically related to, included in a header of the UI resource, etc.) one or more specific UI resources in UI resources 406. In a similar manner, predefined metadata 404 is also associated with one or more of the UI resources depicted by UI resources 406. These predefined metadata 404 may or may not be sensible or memorable for a specific user, who is thus able to create her user-created metadata as described above. Note that while the UI resources are UI resources as defined above, in an alternate embodiment each UI resource may be for a particular task, such as "Turn on computer," "Boot program," "Sweep memory for viruses," etc.

Note that UI resources, or alternatively tasks, may be consolidated into groups. If so, then such groups may also be assigned user-created group metadata 408, which is associated with specific UI resources found in UI resources 406. Alternatively, such user-created group metadata may be associated with user-defined metadata 402 and/or predefined metadata 404, such that the association between the user-created group metadata 408 and UI resources in UI resources 406 is indirect.

Figure 4B:
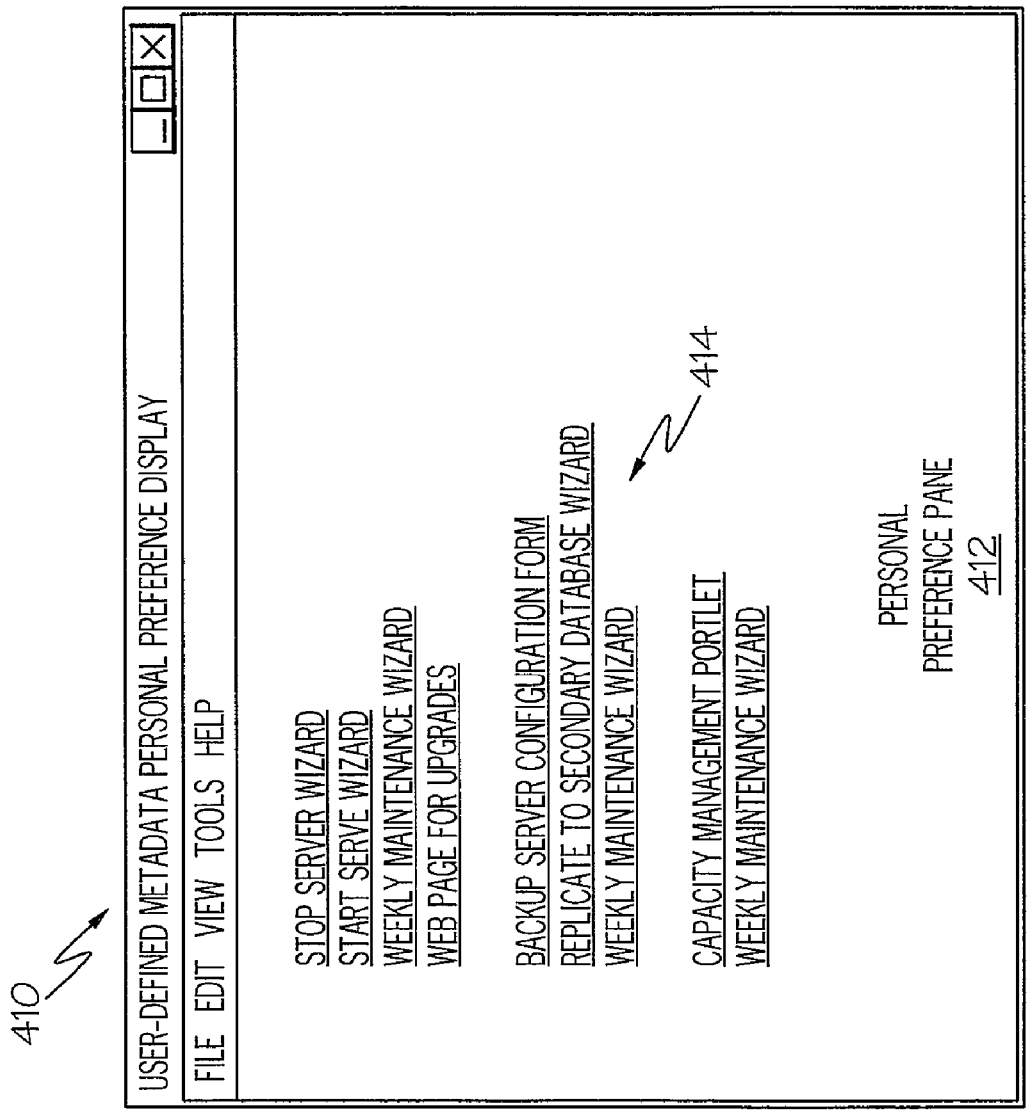
FIG. 4B depicts a UI in which some or all user-created metadata is presented in a user's personal preference pane.

As shown in FIG. 4B, the user-defined metadata can be displayed in a personal preference pane 412, as shown in UI 410. That is, some or all user-defined metadata 414 can be displayed in a manner that allows a user to quickly locate and access UI resources associated with the user-defined metadata 414. Alternatively, these user-defined metadata 414 can be shared with other users. That is, the user who created the user-defined metadata 414 can export the user-defined metadata 414 to another user (e.g., a member of the user's team), such that the other user can also access the UI resources using the newly-created user-created metadata 414.

Figure 5:
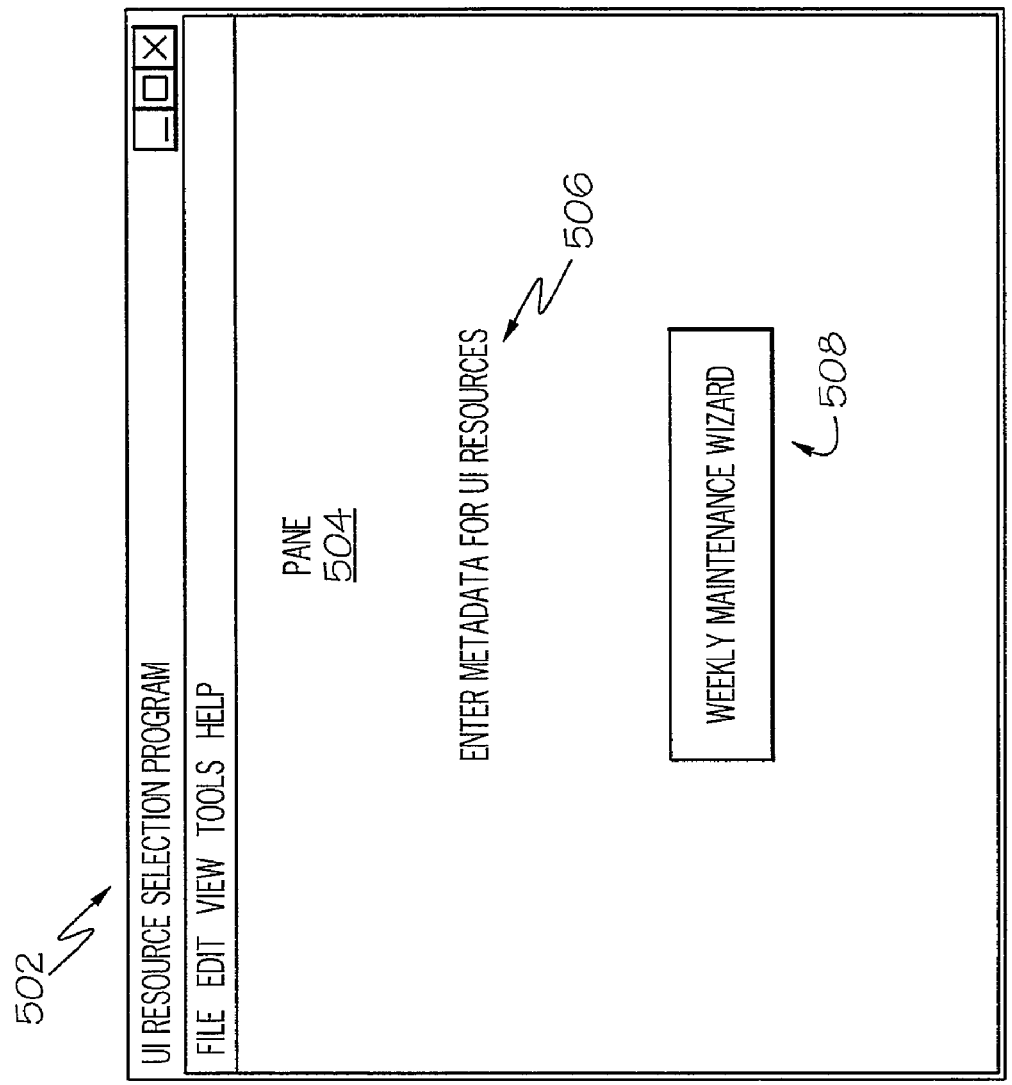
FIG. 5 illustrates a UI for a UI resource selection program that is used to search for one or more tasks that have the associated user-created metadata.
Figure 6A:
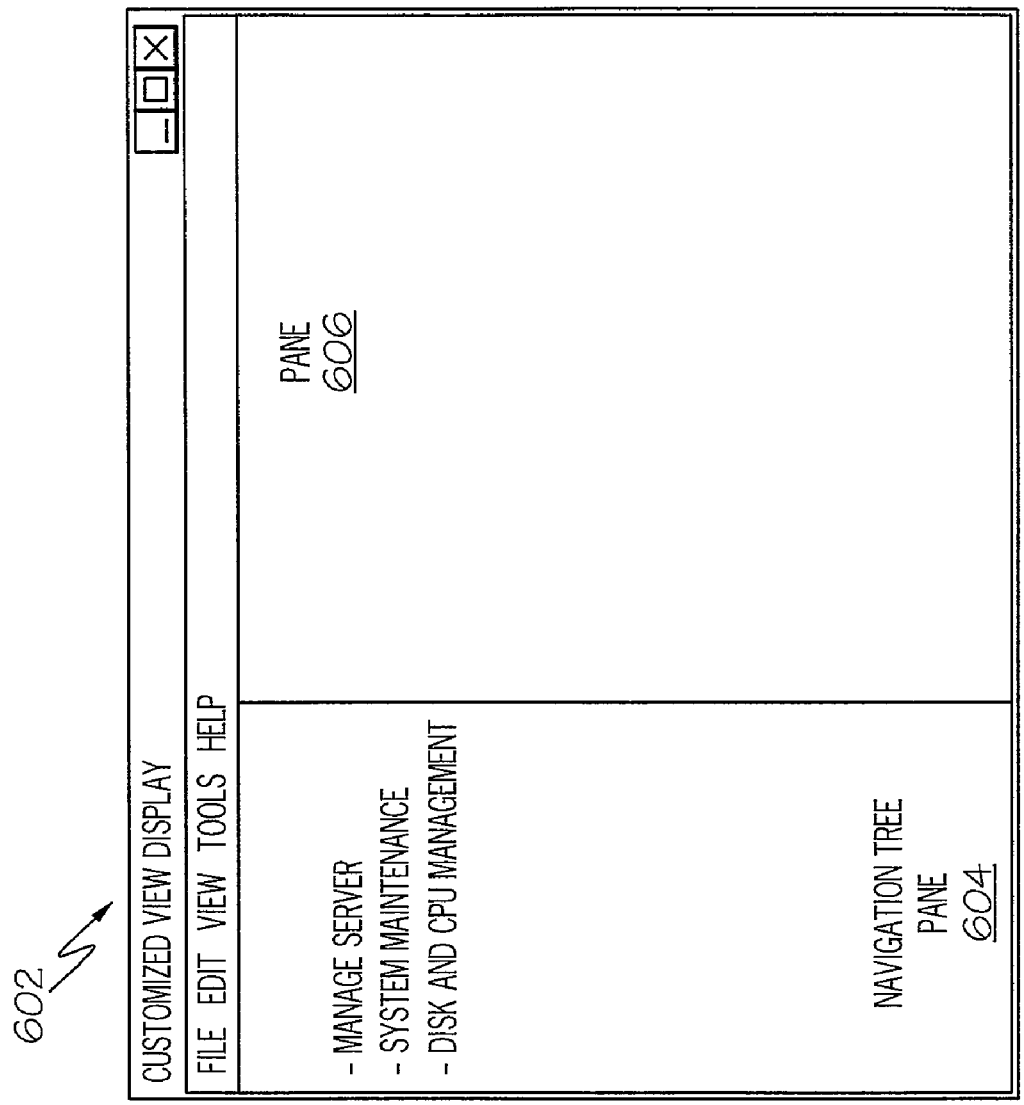
FIGS. 6A-B depict the searched for and located UI resources that have the associated user-created metadata.
Figure 6B:
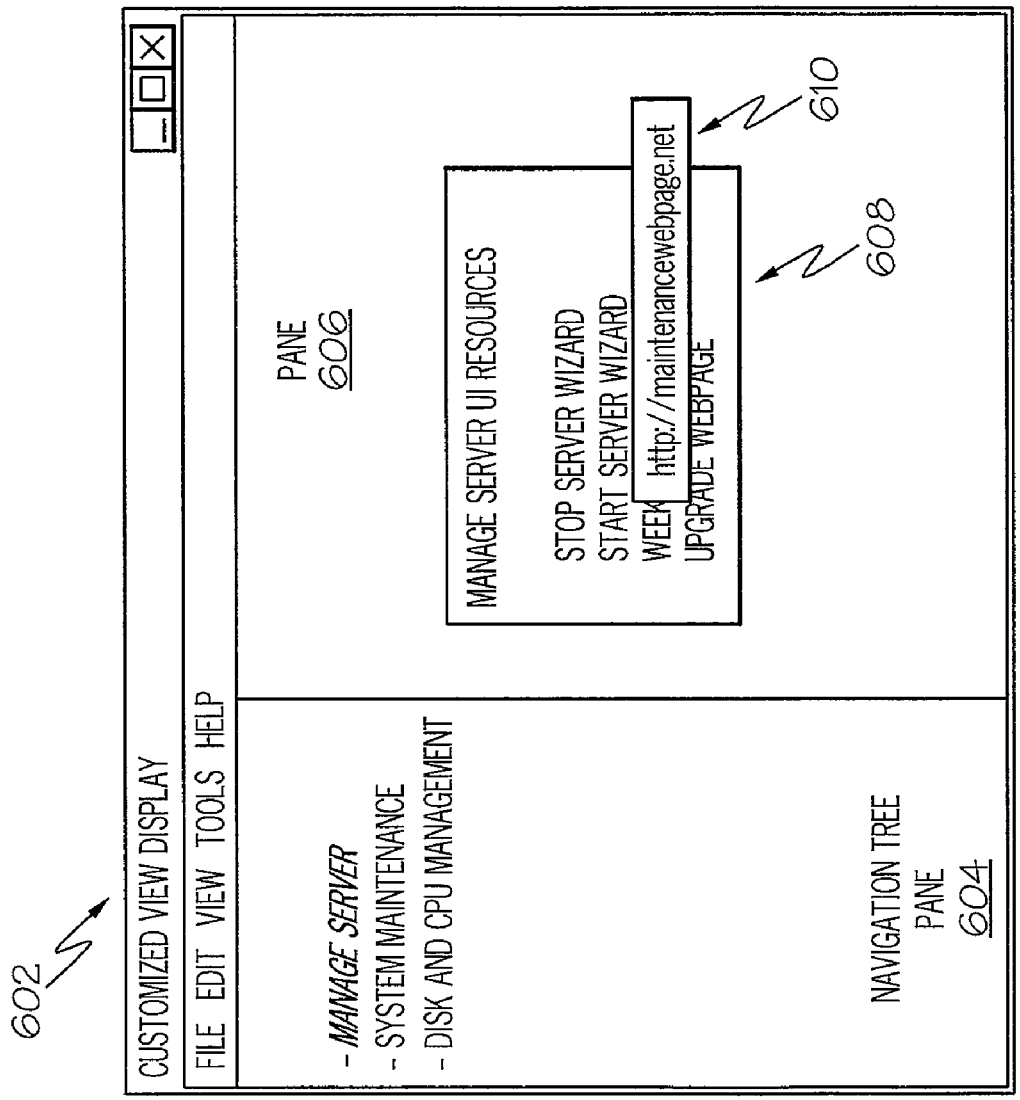

With reference now to FIG. 5, a UI 502 for a UI resource selection program is shown. At this point, it is understood that a user may have defined her unique user-created metadata. Pane 504 includes instructions 506 for entering user-created metadata into input widget 508. In the example shown, the user has entered "Weekly maintenance." In the example shown in FIGS. 1-3, this metadata tag was associated with three developer-named UI resources, "Manage server," "System Maintenance," and "Disk and CPU management." As shown in FIG. 6A, entering "Weekly maintenance wizard" in input widget 508 has resulted in the display of a UI 602 for a customized view display. This customized view shows only the UI resources "Manage server," "System Maintenance," and "Disk and CPU management" in the navigation tree pane 604, such that all other UI resources (e.g., for "Server 1") that are not associated with the user-created metadata "Weekly maintenance wizard" have been filtered out of the display. Initially, pane 606 is empty. However, as shown in FIG. 6B, clicking a particular task (i.e., "Manage server") results in pane 606 displaying, in field 608, all resources and tasks associated with the task "Manage server." Note the following about the display shown in field 608.

First, UI resources, which make up the main UI resource that is presented, may have been renamed to comport with the user-created metadata. That is, the task "Stop Server wizard" may have been originally named "Deactivate computer wizard." However, this task has been renamed to be more sensible to the user. Second, more UI resources than those described by the user ("Upgrade webpage") may be shown in field 608. The user can still click these UI resources if she so desires. Third, each UI resource may be linked to a specific file, webpage or other resource. In the example shown, the UI resource "Weekly maintenance wizard" has been associated with a URL "http://maintenance webpage.net", which is shown in pop-up window 610. Pop-up window 610 appears when a user hovers a cursor over the active area, in field 608, for "Weekly maintenance." By clicking this hyperlink, the user is taken directly to a webpage that supports the process of weekly maintenance of Server 1. Alternatively, a link to an executable file may be popped-up by hovering a cursor over the subtask name "Weekly maintenance." For example, assume that such a link/file is named "weekly_maint_wizard.exe". By clicking this link, the file "weekly_maint_wizard.exe" is auto-run to perform a series of maintenance routines on Server 1. This UI resource, as well as other UI resources (including text instructions, links, portlets, etc.), which are logically depicted in FIG. 4A, can "pop up" in pane 606, another window in UI 602, or another UI (e.g., a displayed webpage) when the UI resource "Weekly maintenance wizard" is clicked.

With reference now to FIG. 7A, a high-level flow-chart of exemplary steps taken to allow a user to create user-created metadata is presented. After initiator block 702, a computer receives a user input selecting one or more UI resources from a user interface. The computer then receives the user-created metadata for the selected one or more UI resources (block 706), and associates this user-created task metadata with the selected UI resources (block 708), thus ending this iteration of the process (terminator block 710).

The user can subsequently use her user-created metadata to manage particular UI resources. Thus, as shown in FIG. 7B, after initiator block 712, the computer receives one or more user-created metadata (block 714). Using this user-created metadata, the UI resources are retrieved (block 716). Preferably, only the retrieved UI resources are displayed (block 718) on a UI, either as originally named, or newly named to be in conformance with the user-created metadata. The process ends in this iteration at terminator block 720.

Figure 8:
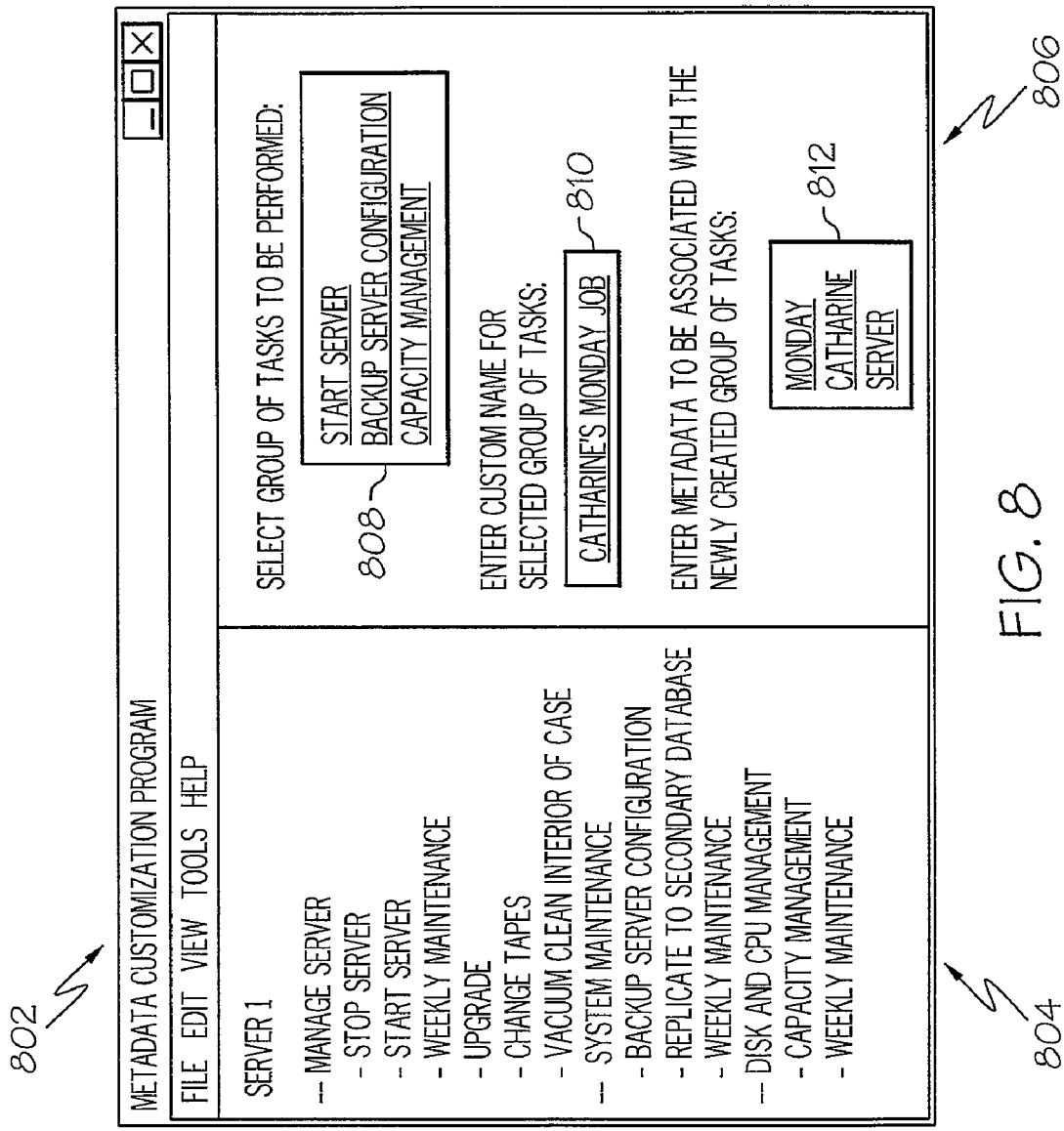
FIG. 8 depicts a UI for a metadata customization program that permits a user to consolidate UI resources that represent tasks into a task group, and to associate the task group with a user-created task group metadata.

As described above, UI resources are defined above as resources that are available to a user through a UI, such as user-fillable forms and other types of data-input widgets, wizards, property notebooks, portlets, etc. However, the above described method for incorporating user-defined metadata to a UI resource can also be implemented to associate user-defined task metadata to particular tasks that are associated with UI resources. Furthermore, such UI resources and/or tasks can be consolidated into groups, such that each group is assigned its own user-created group metadata. Thus, with reference now to FIG. 8, groups of tasks can be managed through the use of consolidation input using previously created user-created metadata (i.e., user-created task metadata) and/or predefined task metadata. As shown in UI 802 for a metadata customization program, various tasks ("Manage server," "System Maintenance," "Disk and CPU management") that can be performed on Server 1 are shown in navigation tree pane 804. Various features (resources that enable the accomplishment of some or all of each task) are also shown. As shown in pane 806, a user can also select groups of tasks for consolidation into a task group. For example, the user can consolidate the various resource features (now named to reflect the user-created task metadata) "Start server" (from "Manage server" task), "Backup server configuration" (from the "System Maintenance" task), and "Capacity management" (from the Disk and CPU management task) by inputting these resources into data input widget 808. This causes these resources to be consolidated into a single task group named "Catharine's Monday Job," which has been input into data input widget 810. As shown in data input widget 812, this task group has been given multiple user-created group metadata by the user. These user-created group metadata include "Monday," "Catharine", and "Server." Returning to FIG. 4A, note that the user-created group metadata 408 may be associated with (e.g., mapped to) either user-created task metadata (in user-created metadata 402) and the predefined metadata 404, or group metadata 408 can be directly associated with UI resources (e.g., tasks).

Figure 9A:
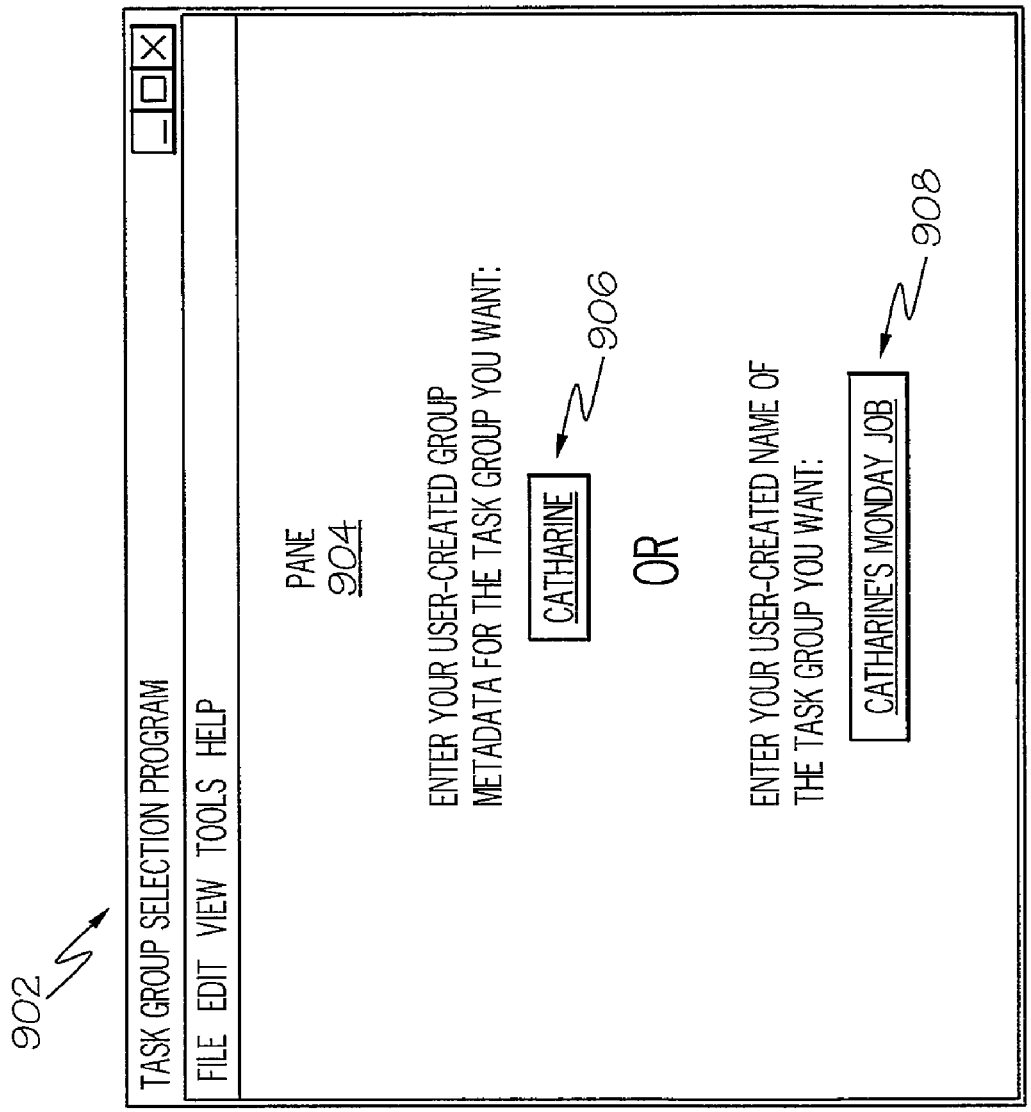
FIGS. 9A-B illustrate UIs for a task group selection program that locates a task group that has been pre-associated with user-created task group metadata.

As shown in FIG. 9A, these new group metadata can be used to pull up a task group. As shown in UI 902 for a task group selection program, a pane 904 includes an input widget 906 for one or more of the group metadata (e.g., "Catharine") associated with a task group, and input widget 906 can receive the user-created task name itself (i.e., "Catharine's Monday Job"). By entering any of the user-created group metadata or the name of the task group itself, the task group and its associated task resources will be pulled up, as shown in FIG. 9B.

Figure 9B:
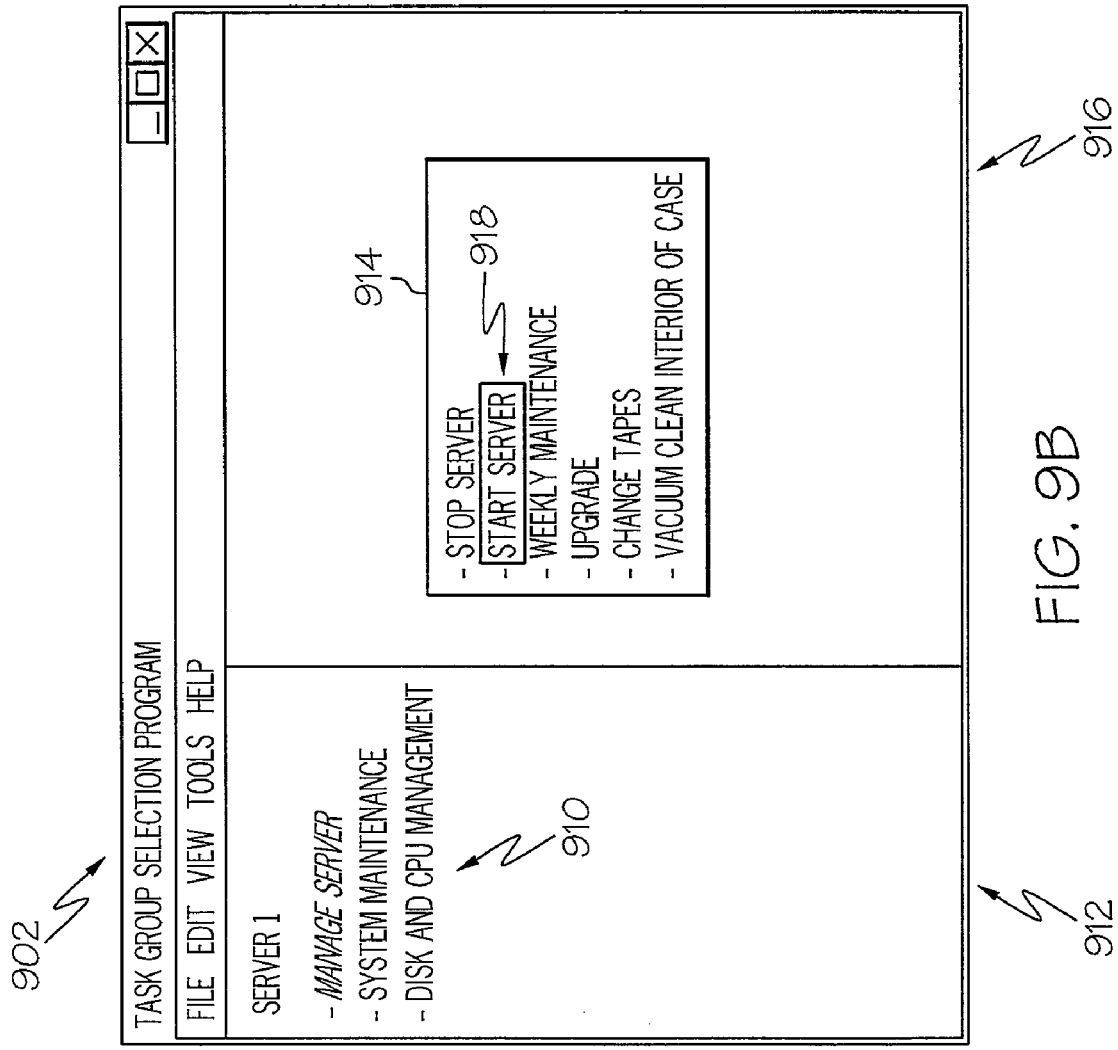

Referring now to FIG. 9B, UI 902 shows the result of entering either "Catharine" or "Catharine's Monday Job" user-created group metadata, as depicted in FIG. 9A. Entering such user-created group metadata results in the tasks 910 ("Manage server," System Maintenance," and "Disk and CPU management") being displayed in navigation page 912. In the example shown, the task "Manage server" has been clicked, resulting in the display of window 914 in pane 916. Note that window 914 must display all resources that are needed to perform the task "Manage server." However, in accordance with the entries into data input widget 808 shown in FIG. 8, the resource "Start server" is highlighted, thus giving the user a visual cue regarding which resource from the task "Manage server" actually needs to be utilized. Alternatively, the custom name for the selected group of tasks (entered into data input widget 810 shown in FIG. 8) may be named "Catharine's Monday Job includes the resources 'Start server,' 'Backup server configuration,'and 'Capacity management.'". This lengthy name provides the user with information needed to select the appropriate resources used to perform a particular task that is displayed.

The process described for managing task groups is depicted in the high-level flow charts shown in FIGS. 10A-B. After initiator block 1002, a computer receives a user input selecting one or more tasks (preferably from a navigation tree pane) that are to be consolidated into a task group (block 1004). As described above, in a preferred embodiment, these tasks are selected from names of tasks that correlate with (e.g., are identical to) user-created task metadata. The selected tasks are consolidated into a task group (block 1006). The metadata for tasks in the newly formed task group is then associated with a user-created task group metadata, predefined metadata and related task resources (block 1008), such that the task group can be identified and retrieved using the user-created task group metadata. The process ends in this iteration at terminator block 1010.

The task group can now be filtered, retrieved and otherwise managed using the user-created task group metadata. As shown in FIG. 10B, after initiator block 1012, a computer receives a user input of one or more user-created task group metadata (block 1014). Each inputted user-created task group metadata describes one or more task groups. Alternatively, the computer can receive a user-created name for a particular single task group. In either case, the computer then retrieves relevant task groups (block 1016) while filtering out any task groups that do not have the requisite user-created task group metadata (or user-created task group name), and presents the relevant task group, as well as associated task resources (or at least links such resources), to the user (block 1018). The process ends the iteration at terminator block 1020.

Note that in one embodiment, in which UI resources are directly associated with specific tasks, UI resources that are associated with the specific tasks are automatically displayed on a UI whenever the user that created the user-created metadata logs onto her computer.

Figure 11:
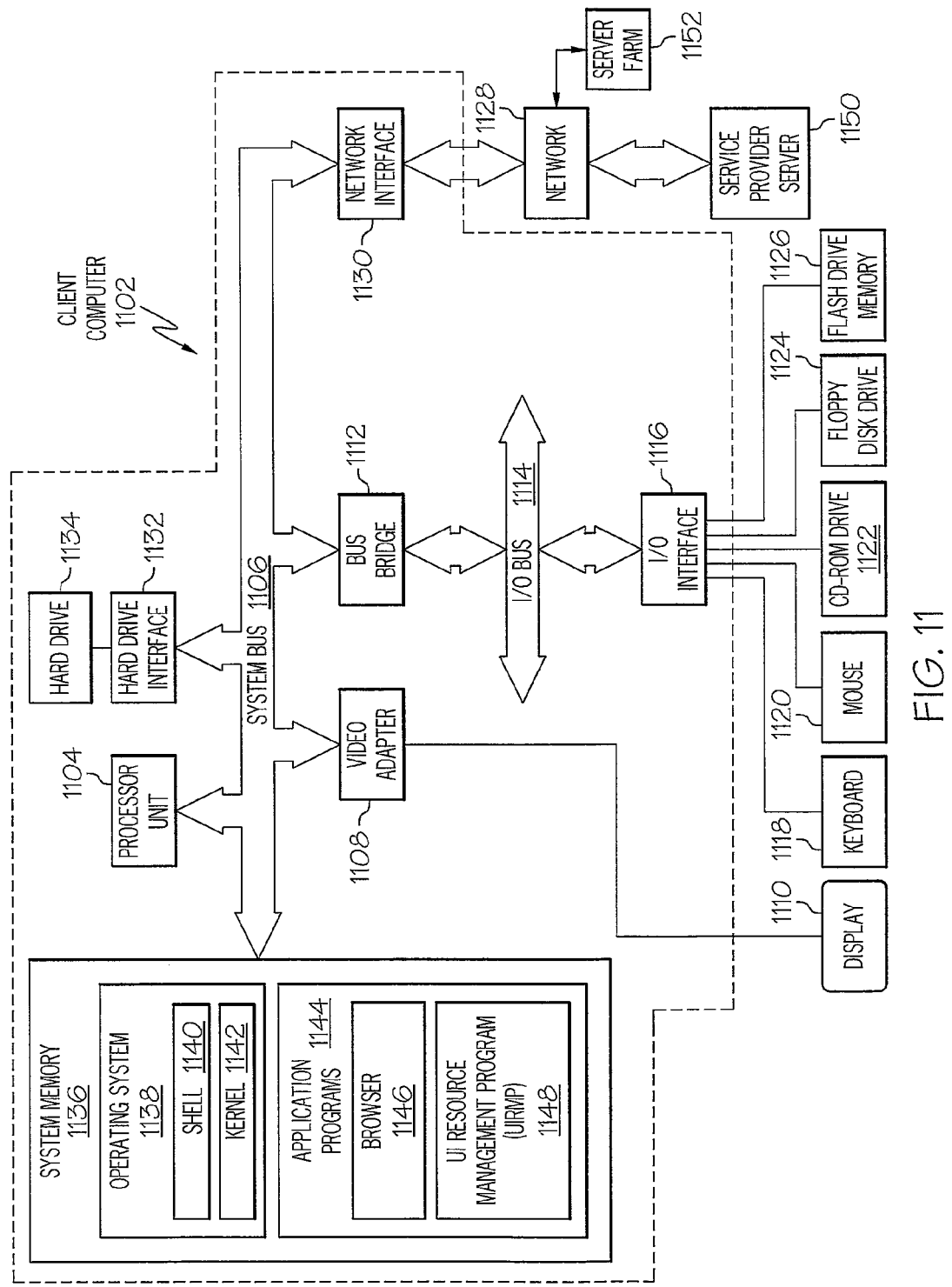
FIG. 11 depicts an exemplary computer in which the present invention may be implemented.

With reference now to FIG. 11, there is depicted a block diagram of an exemplary client computer 1102, in which the present invention may be utilized. Client computer 1102 includes a processor unit 1104 that is coupled to a system bus 1106. A video adapter 1108, which drives/supports a display 1110, on which UI's described herein are displayed, is also coupled to system bus 1106. System bus 1106 is coupled via a bus bridge 1112 to an Input/Output (I/O) bus 1114. An I/O interface 1116 is coupled to I/O bus 1114. I/O interface 1116 affords communication with various I/O devices, including a keyboard 1118, a mouse 1120, a Compact Disk-Read Only Memory (CD-ROM) drive 1122, a floppy disk drive 1124, and a flash drive memory 1126. The format of the ports connected to I/O interface 1116 may be any known to those skilled in the art of computer architecture, including but not limited to Universal Serial Bus (USB) ports.

Client computer 1102 is able to communicate with a service provider server 1150 via a network 1128 using a network interface 1130, which is coupled to system bus 1106. Network 1128 may be an external network such as the Internet, or an internal network such as an Ethernet or a Virtual Private Network (VPN).

A hard drive interface 1132 is also coupled to system bus 1106. Hard drive interface 1132 interfaces with a hard drive 1134. In a preferred embodiment, hard drive 1134 populates a system memory 1136, which is also coupled to system bus 1106. System memory is defined as a lowest level of volatile memory in client computer 1102. This volatile memory may include additional higher levels of volatile memory (not shown), including but not limited to cache memory, registers, and buffers. Data that populates system memory 1136 includes client computer 1102's operating system (OS) 1138 and application programs 1144.

OS 1138 includes a shell 1140, for providing transparent user access to resources such as application programs 1144. Generally, shell 1140 is a program that provides an interpreter and an interface between the user and the operating system. More specifically, shell 1140 executes commands that are entered into a command line user interface or from a file. Thus, shell 1140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 1142) for processing. Note that while shell 1140 is a text-based, line-oriented user interface, the present invention will equally well support other user interface modes, such as graphical, voice, gestural, etc.

As depicted, OS 1138 also includes kernel 1142, which includes lower levels of functionality for OS 1138, including providing essential services required by other parts of OS 1138 and application programs 1144, including memory management, process and task management, disk management, and mouse and keyboard management.

Application programs 1144 include a browser 1146. Browser 1146 includes program modules and instructions enabling a World Wide Web (WWW) client (i.e., client computer 1102) to send and receive network messages to the Internet using HyperText Transfer Protocol (HTTP) messaging, thus enabling communication with service provider server 1150.

Application programs 1144 in client computer 1102's system memory also include a User Interface Resource Management Program (UIRMP) 1148, which includes code for implementing the processes and User Interfaces (UIs) described in FIGS. 1-10. Such processes include, but are not limited to, maintaining the data and resources relationships described in detail in FIG. 4.

In one embodiment, client computer 1102 is able to download UIRMP 1148 from service provider server 1150, preferably in an "on demand" basis.

Note that the hardware architecture for service provider server 1150 may be substantially similar to that shown for client computer 1102. Similarly, servers found in server farm 1152 may utilize a substantially similar architecture to that found in client computer 1102.

Server farm 1152 includes servers that may provide resources such as the UI resources described above. Alternatively, such UI resources and/or task descriptors may be maintained within disk drive 1134 and/or system memory 1136 of client computer 1102 or service provider server 1150.

The hardware elements depicted in client computer 1102 are not intended to be exhaustive, but rather are representative to highlight essential components required by the present invention. For instance, client computer 1102 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 1150 performs all of the functions associated with the present invention (including execution of UIRMP 1148), thus freeing client computer 1102 from using its own resources.

It should be understood that at least some aspects of the present invention may alternatively be implemented in a computer-useable medium that contains a program product. Programs defining functions of the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of UIRMP 1148, are performed by service provider server 1150. Alternatively, UIRMP 1148 can be deployed as software from service provider server 1150 to client computer 1102. This deployment may be performed in an "on demand" basis manner, in which UIRMP 1148 is only deployed when needed by client computer 1102. In another embodiment, process software for the method so described may be deployed to service provider server 1150 by another service provider server (not shown).

As described above in an exemplary embodiment, presently presented are a method and system that provides a user with the ability to organize User Interface (UI) elements in a manner that eases finding specific UI resources and/or tasks. This is achieved by providing User Interface (UI) capabilities to annotate UI elements with specific metadata that makes sense to the particular user. The metadata could be used either to make searches possible using terminology that is natural to the user, or to enable multiple ways of filtering navigation content (e.g., to show a user only the specific set of control elements he finds relevant for the his task at hand) or other control elements (such as a portlet, a Web page, or a form). Since the metadata is expressed in terms provided by a particular user, that user is freed from having to remember vendor-specific terms for performing searches. The herein described method and system also allows the user to group together sets of control elements that he uses together to perform a personal task, or that he uses on different days of the week, or whatever organization approach is most natural to him. Thus, the user can shape the navigation of a large-scale user interface to match his personal vocabulary and work style, without creating yet another object, such as a bookmark file, that has to be maintained. The presently disclosed method and system also allows the user to have multiple organizational levels, such that tasks that are not appropriate for a particular time of day or type of task may be filtered out during a search of tasks (or resources).

In one embodiment, a user defines or assigns metadata or keywords to pages, navigation elements (for example, nodes and leaves in a navigation tree), and other interface control elements while using an application or viewing information (for example, a Web page). Since created by the user, the user can later locate a UI resource using his own terminology rather than having to learn the application vendor's or content provider's vocabulary.

One embodiment of the present invention also includes a mechanism for the user to make personal notations (add, view, modify, delete notations individually and collectively) and a mechanism to filter, sort, or search on vendor-supplied, user-supplied, or both types of keywords. These user-specified annotations or metadata may be included in any search, sort, or filter action to locate matches.

As a further convenience, a mechanism to categorize the individual or group (node and leaves) annotated navigational entries, pages/panels, and content into user-created categories can be provided. It is further noted that the user-created task metadata and/or user-created group metadata is comprised of anything that the user finds helpful to locate a user interface resource, including but not limited to timeframe references, system data, user data, activity related data, or any other data that has particular meaning to the user.

Note that the method steps described herein may be implemented in a computer system, and may further be executed by instructions that are stored in a computer-readable medium.

In another embodiment, in which the methods described herein are performed by software that is stored on a computer-readable medium, the computer-readable medium is a component of a remote server, and the computer executable instructions are deployable to a client computer and/or a supervisory computer from the remote server. This deployment may be provided by a service provider to a customer computer (e.g., the client computer and/or the supervisory computer) on an on-demand basis.

Note that while the creation and use of user-created metadata is described for exemplary purposes as being used by the user who created the user-created metadata, such user-created metadata can be shared with other users for their use.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method for customizing navigation of User Interface (UI) resources that are displayed on a computer User Interface (UI), the computer-implemented method comprising:
   receiving an input of user-created metadata that identifies one or more User Interface (UI) resources;
   a processor associating the user-created metadata with a link to one or more User Interface (UI) resources that are depicted on a computer User Interface (UI);
   in response to a user inputting specific metadata, retrieving the link to the one or more UI resources that are associated with the specific metadata that has been input by the user;
   transmitting an instruction to cause the computer UI to display the link to the one or more UI resources that are associated with the specific metadata that has been input by the user;
   displaying a navigation page of tasks on a UI; and
   in response to a specific task from the navigation page being activated, displaying all UI resources needed to perform the specific task, wherein all UI resources displayed are named as the user-created metadata.

2. The computer-implemented method of claim 1, wherein each of the UI resources is associated with a user-identified task that is associated with the user-created metadata.

3. The computer-implemented method of claim 1, wherein the specific metadata is a combination of user-created metadata and predefined metadata, wherein the predefined metadata was created and fixed by a product designer for association with specific UI resources.

4. The computer-implemented method of claim 1, further comprising:
   receiving a consolidation input from the user, wherein the consolidation input consolidates multiple UI resources into a UI resource group; and
   receiving a user-created UI resource group metadata from the user, wherein the user-created UI resource group metadata is associated with the UI resource group.

5. The computer-implemented method of claim 4, further comprising:
   receiving the user-created UI resource group metadata from a user input;
   retrieving any UI resource group that is associated with the user-created UI resource group metadata that is received from the user input; and
   transmitting an instruction to cause the computer UI to display any retrieved UI resource group that is associated with the user-created UI resource group metadata that is received from the user input.

6. The computer-implemented method of claim 1, further comprising:
   detecting a log-on signal for a specific user; and
   in response to the specific user logging on, transmitting an instruction to cause the computer UI to automatically display any UI resource that is associated with a specific task.

7. The computer-implemented method of claim 1, further comprising:
   saving the user-created metadata as a personal preference for a specific user that created the user-created metadata;
   detecting a log-on signal for the specific user; and
   in response to the specific user logging on, transmitting an instruction to cause the computer UI to automatically display any UI resource that is associated with the specific user by the user-created metadata.

8. The computer-implemented method of claim 1, wherein the user-created metadata is based on a reference subject selected from a group that includes a timeframe reference data, a system data, a user data, and an activity related data, wherein the timeframe reference, system data, user data and activity related data are all data that have been previously utilized by the user that created the user-created metadata.

9. The computer-implemented method of claim 1, wherein each UI resource identified by the user-created metadata is a task resource that is associated with a particular user-identified task.

10. The computer-implemented method of claim 9, wherein the at least one task resource is a portlet used by the particular user-identified task.

11. The computer-implemented method of claim 1, wherein the one or more UI resources are one or more data-input widgets.

12. The computer-implemented method of claim 1, further comprising:
   filtering out, from the computer UI, any computer tasks that are not associated with the specific metadata that was input by the user.

13. The computer-implemented method of claim 1, wherein the user-created metadata is input on a first UI, and wherein the computer-implemented method further comprises:
  displaying the user-created metadata in a personal preference pane on a second UI, wherein the second UI is a different UI than the first UI.

14. The computer-implemented method of claim 1, further comprising:
  in response to the link being executed to retrieve the one or more UI resources, displaying, on a UI, only the one or more UI resources that are retrieved by the link being executed.

15. The computer-implemented method of claim 1, wherein the one or more UI resources are one or more wizards for guiding a user through a computer maintenance process.

16. The computer-implemented method of claim 1, wherein the one or more UI resources are one or more web pages.

17. A system comprising:
  a processor;
  a data bus coupled to the processor;
  a memory coupled to the data bus; and
  a computer-usable medium embodying computer program code, the computer program code comprising instructions that, when executed by the processor, perform a computer-implemented method of customizing navigation of User Interface (UI) resources that are displayed on a computer User Interface (UI), the computer-implemented method comprising:
    receiving an input of user-created metadata that identifies one or more User Interface (UI) resources;
    associating the user-created metadata with one or more User Interface (UI) resources that are depicted on a computer User Interface (UI);
    in response to a user inputting specific metadata, retrieving the one or more UI resources that are associated with the specific metadata that has been input by the user;
    transmitting an instruction to cause the computer UI to display the link to the one or more UI resources that are associated with the specific metadata that has been input by the user;
    displaying a navigation page of tasks on a UI; and
    in response to a specific task from the navigation page being activated, displaying all UI resources needed to perform the specific task, wherein all UI resources displayed are named as the user-created metadata.

18. The system of claim 17, wherein the specific metadata is a combination of the user-created metadata and predefined metadata, wherein the predefined metadata was created and fixed by a product designer for association with specific UI resources.

19. A non-transitory computer-readable storage medium encoded with a computer program, the computer program comprising computer executable instructions that, when executed on a processor, perform a method comprising:
  receiving an input of user-created metadata that identifies one or more User Interface (UI) resources;
  associating the user-created metadata with one or more User Interface (UI) resources that are depicted on a User Interface (UI);
  in response to a user inputting specific metadata, retrieving the one or more UI resources that are associated with the specific metadata that has been input by the user;
  transmitting an instruction to cause the computer UI to display the link to the one or more UI resources that are associated with the specific metadata that has been input by the user;
  displaying a navigation page of tasks on a UI; and
  in response to a specific task from the navigation page being activated, displaying all UI resources needed to perform the specific task, wherein all UI resources displayed are named as the user-created metadata.

\* \* \* \* \*